United States Patent
Lee et al.

(10) Patent No.: US 8,621,897 B2
(45) Date of Patent: Jan. 7, 2014

(54) MOTOR INCLUDING STATOR WITH METAL CONNECTION PARTS AND WASHING MACHINE HAVING THE SAME

(75) Inventors: Woon Yong Lee, Suwon-si (KR); Jong Jin Lee, Cheonan-si (KR); Myong Gui Choi, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1001 days.

(21) Appl. No.: 12/656,191

(22) Filed: Jan. 20, 2010

(65) Prior Publication Data

US 2010/0199725 A1    Aug. 12, 2010

(30) Foreign Application Priority Data

Feb. 6, 2009   (KR) .................. 10-2009-0009790

(51) Int. Cl.
  *D06F 37/30*   (2006.01)
  *H02K 3/52*   (2006.01)
(52) U.S. Cl.
  USPC .............................. 68/140; 310/71
(58) Field of Classification Search
  USPC .................. 310/71; 68/139–140; 336/192
  See application file for complete search history.

(56) References Cited

U.S. PATENT DOCUMENTS

| | | | |
|---|---|---|---|
| 3,708,878 A * | 1/1973 | Mann et al. ................. | 29/860 |
| 3,979,615 A * | 9/1976 | Neff ............................. | 310/71 |
| 4,054,349 A * | 10/1977 | Wuttke ........................ | 439/391 |
| 4,322,647 A * | 3/1982 | Neroda et al. ............... | 310/71 |
| 4,476,407 A * | 10/1984 | Hildebrandt et al. ....... | 310/71 |
| 4,649,304 A * | 3/1987 | Atherton et al. ............. | 310/71 |
| 4,656,378 A * | 4/1987 | Atherton et al. ............. | 310/71 |
| 4,672,348 A * | 6/1987 | Duve ........................... | 336/192 |
| 7,544,892 B2 * | 6/2009 | Susai et al. .................. | 174/84 R |
| 2004/0232785 A1 * | 11/2004 | Yamada et al. .............. | 310/71 |
| 2007/0285852 A1 * | 12/2007 | Gupta .......................... | 361/38 |
| 2008/0129131 A1 * | 6/2008 | Shin et al. ................... | 310/71 |
| 2009/0189475 A1 * | 7/2009 | Shin ............................. | 310/195 |

FOREIGN PATENT DOCUMENTS

CN   101192767 A   6/2008

OTHER PUBLICATIONS

Chinese Office Action mailed May 2, 2013 for corresponding Chinese Application No. 201010114089.6.

* cited by examiner

*Primary Examiner* — Joseph L Perrin
(74) *Attorney, Agent, or Firm* — Staas & Halsey LLP

(57) ABSTRACT

Disclosed herein are a motor, which prevents cut-off of magnet wire connection parts due to corrosion caused by a potential difference and damage to a magnet wire film, and a washing machine having the motor. The motor includes a stator, on which a magnet wire is wound, including mag mate terminals connected with the magnet wire, and a rotor rotated by electromagnetic interaction with the stator. Each of the mag mate terminals includes a first metal connection part, to which a metal of a different kind is connected, and a same kind metal connection part, to which a metal of the same kind is connected.

18 Claims, 7 Drawing Sheets

MOTOR INCLUDING STATOR WITH METAL CONNECTION PARTS AND WASHING MACHINE HAVING THE SAME

CROSS-REFERENCE TO RELATED APPLICATIONS

This application claims the benefit of Korean Patent Application No. 2009-0009790, filed on Feb. 6, 2009, in the Korean Intellectual Property Office, the disclosure of which is incorporated herein by reference.

BACKGROUND

1. Field

Embodiments of the present invention relates to a motor, the structure of which is improved to prevent cut-off of magnet wire connection parts due to corrosion caused by a potential difference and damage to a magnet wire film, and a washing machine having the motor.

2. Description of the Related Art

In general, drum washing machines are apparatuses that wash laundry using frictional force between a drum rotated by the driving force of a motor and the laundry under the condition that detergent, washing water, and the laundry are put into the drum. These drum washing machines scarcely cause damage to the laundry and tangling of the laundry.

The drum washing machines are divided into an indirect connection type, in which the driving force of a motor is indirectly transmitted to a drum through a belt wound on a motor pulley and a drum pulley, and a direct connection type, in which the driving force of a motor is directly transmitted to a drum by directly connecting a BLDC motor to a tub, according to driving methods.

A motor to drive a drum washing machine includes a stator and a rotor, and the rotor is rotated by electromagnetic interaction with the stator.

A magnet wire is wound on the stator, and the rotor is rotated against the stator by applying current to the magnet wire.

The magnet wire, which is generally made of copper, is wound on the stator. The reason copper is used is because copper has both excellent electrical conductivity and excellent ductility and thus is scarcely damaged when the magnet wire made of copper is wound on the stator.

However, copper has a high price, and thus the production cost of the motor is increased. Further, international demand for copper has suddenly risen, and there are many cases that stable demand and supply of a raw material is not carried out.

Therefore, many attempts to reduce the production cost of the motor using a coil made of materials other than copper have been made. Particularly, an attempt to replace copper (Cu) having a high price with aluminum (Al) having a low price has been vigorously made.

However, when a magnet wire made of aluminum is used, the corrosion of the magnet wire due to a potential difference is increased and the tensile strength and the hardness of the magnet wire are decreased, compared with the magnet wire made of copper. Therefore, cut-off of mag mate terminal regions, to which the magnet wire is connected, is generated due to corrosion caused by the potential difference, and a magnet wire film is damaged.

SUMMARY

Therefore, it is an aspect of the present embodiment to provide a motor, which prevents cut-off of magnet wire connection parts due to corrosion caused by a potential difference and damage to a magnet wire film, and a washing machine having the motor.

Additional aspects of the invention will be set forth in part in the description which follows and, in part, will be obvious from the description, or may be learned by practice of the invention.

The foregoing and/or other aspects are achieved by providing a motor includes a stator, on which a magnet wire is wound, including mag mate terminals connected with the magnet wire, each of the mag mate terminals including a first metal connection part connected to a metal of a different kind than the first metal connection part, and a second metal connection part connected to a metal of a same kind as the second connection part, and a rotor rotated by electromagnetic interaction with the stator.

The magnet wire may be connected to the first metal connection part, the first metal connection part including a sealing member to seal a connection portion between the first metal connection part and the magnet wire to prevent corrosion due to a potential difference.

The stator may include a stator core and insulators surrounding the exterior of the stator core and provided with winding parts, on which the magnet wire is wound, each of the winding parts including bending parts having rounded corners.

Each of the winding parts further may include a groove formed at a central portion of each of the winding parts.

The radius of curvature of the bending parts may be about 1.5 times to about 5 times the diameter of the magnet wire.

The sealing member may be made of epoxy resin.

Further, the sealing member may be made of synthetic resin.

Further, the sealing member may be made of bond.

The magnet wire may be made of aluminum, and the mag mate terminals may be made of brass.

The foregoing and/or other aspects are achieved by providing a washing machine including a tub, a drum rotated in the tub, a stator mounted on the rear surface of the tub, and including mag mate terminals connected with a magnet wire, each of the mag mate terminals including a first metal connection part connected to a metal of a different kind than the first metal connection part, and a second metal connection part connected to a metal of a same kind as the second connection part, and a rotor rotating the drum by electromagnetic interaction with the stator.

The magnet wire may be connected to the first metal connection part, the first metal connection part including a sealing member to seal a connection portion between the first connection part and the magnet wire to prevent corrosion due to a potential difference.

The stator may include a stator core and insulators surrounding the exterior of the stator core and provided with winding parts, on which the magnet wire is wound, and each of the winding parts may include bending parts, the corners of which are rounded.

Each of the winding parts may further include a groove formed at a central portion of each of the winding parts.

The radius of curvature of the bending parts may be about 1.5 times to about 5 times the diameter of the wound magnet wire.

The sealing member may be made of epoxy resin.

Further, the sealing member may be made of synthetic resin.

Further, the sealing member may be made of bond.

The magnet wire may be made of aluminum, and the mag mate terminals may be made of brass.

The foregoing and/or other aspects are achieved by providing a motor includes a stator, on which a magnet wire is wound, including mag mate terminals connected with the magnet wire, each of the mag mate terminals including an anti-corrosion member at a connection portion between each of the mag mate terminals and the magnet wire to prevent corrosion due to a potential difference, and a rotor rotated by electromagnetic interaction with the stator.

The anti-corrosion member may surround and seal the connection portion between each of the mag mate terminals and the magnet wire.

The sealing member may be made of epoxy resin.

Further, the sealing member may be made of synthetic resin.

Further, the sealing member may be made of bond.

The foregoing and/or other aspects are achieved by providing a washing machine includes a tub, a drum rotated in the tub, a stator mounted on the rear surface of the tub, and including mag mate terminals connected with a magnet wire, each of the mag mate terminals including an anti-corrosion member at a connection portion between each of the mag mate terminals and the magnet wire to prevent corrosion due to a potential difference, and a rotor rotating the drum by electromagnetic interaction with the stator.

The anti-corrosion member may surround and seal the connection portion between each of the mag mate terminals and the magnet wire.

The sealing member may be made of epoxy resin.

Further, the sealing member may be made of synthetic resin.

Further, the sealing member may be made of bond.

The foregoing and/or other aspects are achieved by providing a stator for a washing machine, including: a magnet wire made of a first type of metal; and a plurality of mag mate terminals made of a second type of metal different from the first type of metal, each of the mag mate terminals having a first metal connection part and a second metal connection part, the first metal connection part being connected to the magnet wire, the second metal connection part being connected to a metal of a same type as the second type of metal from which the mag mate terminals are made.

The first metal connection part may include a sealing member sealing a connection portion between the first metal connection part and the magnet wire to prevent corrosion due to a potential difference.

A lower portion of the first metal connection part and a lower portion of the second metal connection part may be connected such that current flows between the first and the second metal connection parts.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF EMBODIMENT

Figure 1:
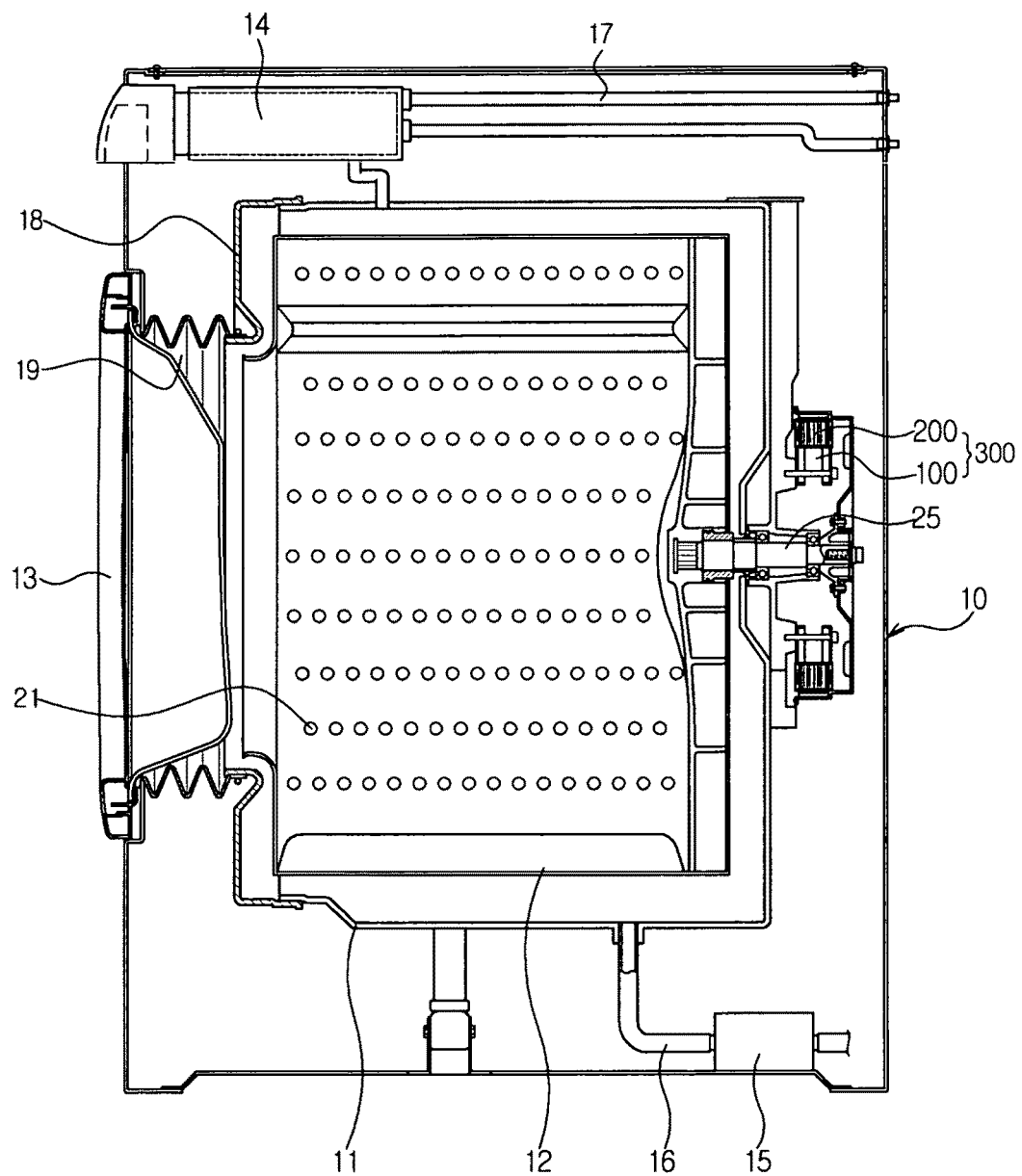
FIG. 1 is a longitudinal-sectional view of a washing machine in accordance with an embodiment.

Reference will now be made in detail to the embodiment, examples of which are illustrated in the accompanying drawings, wherein like reference numerals refer to the like elements throughout.

FIG. 1 is a longitudinal-sectional view of a washing machine in accordance with an embodiment.

As shown in FIG. 1, the washing machine in accordance with the embodiment includes a case 10 forming an external appearance of the washing machine, a tub 11 installed in the case 10 to store washing water, a drum 18 rotatably installed in the tub 11, and a motor 300 to drive the drum 18.

An opening 19, through which laundry is put into the washing machine, is formed through the front surface of the case 10, and is opened and closed by a door 13 rotatably installed on the case 10.

Lifters 12 to raise the laundry in the drum 18 to a designated position are installed on the inner circumferential surface of the drum 18, and a plurality of through holes 21 is formed through the circumferential surface of the drum 18 such that the washing water is discharged from the drum 18 through the through holes 21 in a washing course, such as dehydrating.

A water supply hose 17 to supply water from an external water source to the inside of the tub 11, and a detergent supply device 14, into which a detergent is placed such that the water supplied through the water supply hose 17 and the detergent are fed into the tub 11, are installed above the tub 11. A drain hose 16 and a drain pump 15 are installed below the tub 11 such that the washing water used in washing and rinsing is discharged to the outside of the washing machine.

The motor 300 mounted on the rear surface of the tub 11 is connected to the drum 18 through a rotary shaft 25, and thus rotates the drum 18.

The motor 300 includes a stator 100 mounted on the rear surface of the tub 11, and a rotor 200 rotated by electromagnetic interaction with the stator 100.

Figure 2:
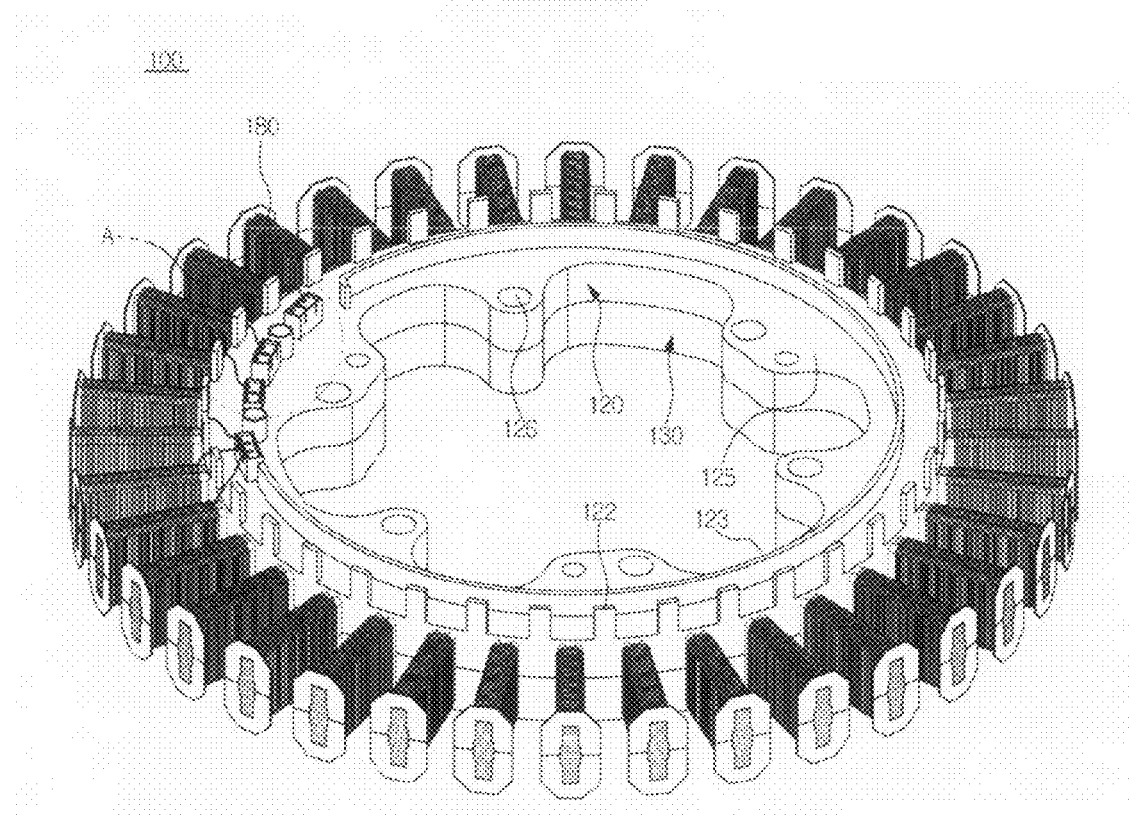
FIG. 2 is a perspective view of a stator, on which a magnet wire is wound, in accordance with the embodiment.
Figure 3:
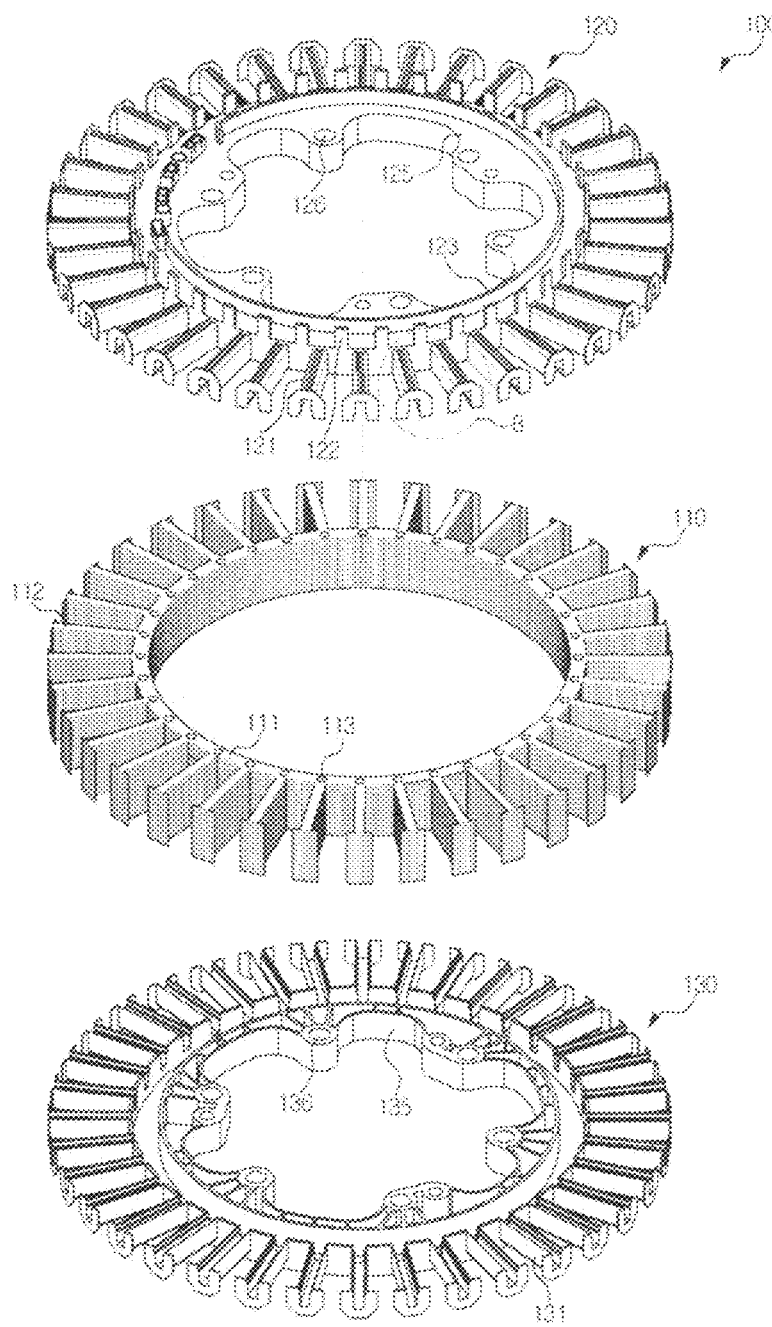
FIG. 3 is an exploded perspective view of the stator in accordance with the embodiment.

FIG. 2 is a perspective view of the stator 100, on which a magnet wire 180 is wound, in accordance with the embodiment, and FIG. 3 is an exploded perspective view of the stator 100 in accordance with the embodiment.

With reference to FIGS. 2 and 3, the stator 100 includes a stator core 110, an upper insulator 120, a lower insulator 130, and the magnet wire 180 wound on the insulators 120 and 130.

The stator core 110 includes a ring-shaped base 111, and teeth 112 protruding outwardly in the radial direction along the outer circumferential surface of the base 111. FIG. 2 illustrates an outer rotor type motor, in which the rotor 200 is provided at the outside of the stator core 110. On the other hand, the teeth 112 may protrude inwardly in the radial direction along the inner circumferential surface of the base 111. In this case, the stator may be a stator of an inner rotor type motor.

The stator core 110 may be formed by punching and stacking steel sheets. In order to reduce raw material waste and simplify a working process, the stator core 110 may be a spiral core formed by bending the band-shaped base 111 and the teeth 112 perpendicularly protruded from the base 111 into a spiral shape.

Calking parts 113 to integrally connect respective layers of the base 111 are formed on the stacked ring-shaped base 111.

The magnet wire 180 is wound on the teeth 112 protruding outwardly in the radial direction of the base 111. However, since the teeth 112 are generally made of a conductive material, the insulators 120 and 130 for insulation are provided between the teeth 112 and the magnet wire 180. FIG. 2 illustrates the stator 100 formed by respectively connecting the upper insulator 120 and the lower insulator 130 to the upper and lower parts of the stator core 110. Differently from FIG. 2, a single insulator may be formed integrally with the stator core 110 by a method, such as insert injection molding.

Winding parts 121 and 131 are respectively formed on the upper insulator 120 and the lower insulator 130. When the upper insulator 120 and the lower insulator 130 are connected, winding part units are respectively formed by connecting the winding parts 121 and 131, and the magnet wire 180 is wound on the winding part units 121 and 131.

In order to prevent separation of the magnet wire 180 from the winding part units 121 and 13, after the magnet wire 180 has been wound on the winding part units 121 and 131 formed by connecting the winding parts 121 of the upper insulator 120 and the winding parts 131 of the lower insulator 130, coil winding ribs 122 are formed on the upper insulator 120.

An insulator rib 123 is formed at the radial inside of the coil winding ribs 122 in the circumferential direction.

An insulator rib 123 is formed on the lower insulator 130 as well as the upper insulator 120. The insulator ribs 123 are formed to a designated height or greater, and thus prevent moisture within the insulators 120 and 130 from flowing toward the winding part units 121 and 131.

Connection parts 125 and 135 protruding in the radial direction are respectively formed at the insides of the insulator ribs 123, and connection holes 126 and 136 to connect the stator 100 to the rear surface of the tub 11 are formed through the connection parts 125 and 135.

The connection holes 126 of the upper insulator 120 and the connection holes 136 of the lower insulator 130 are respectively connected to form connection hole units. Connection members (not shown), such as bolts, for example, respectively pass through the connection hole units, and are connected to grooves (not shown) formed on the rear surface of the tub 11, thereby mounting the stator 100 on the tub 11.

The magnet wire 180 wound on the winding part units 121 and 131 of the stator 100 in accordance with the embodiment may be made of aluminum rather than copper. The reason to use aluminum rather than copper is because aluminum has a lower price than copper and equivalent electrical conductivity, but the magnet wire 180 is not limited thereto and may be made of various other metals.

Figure 4A:
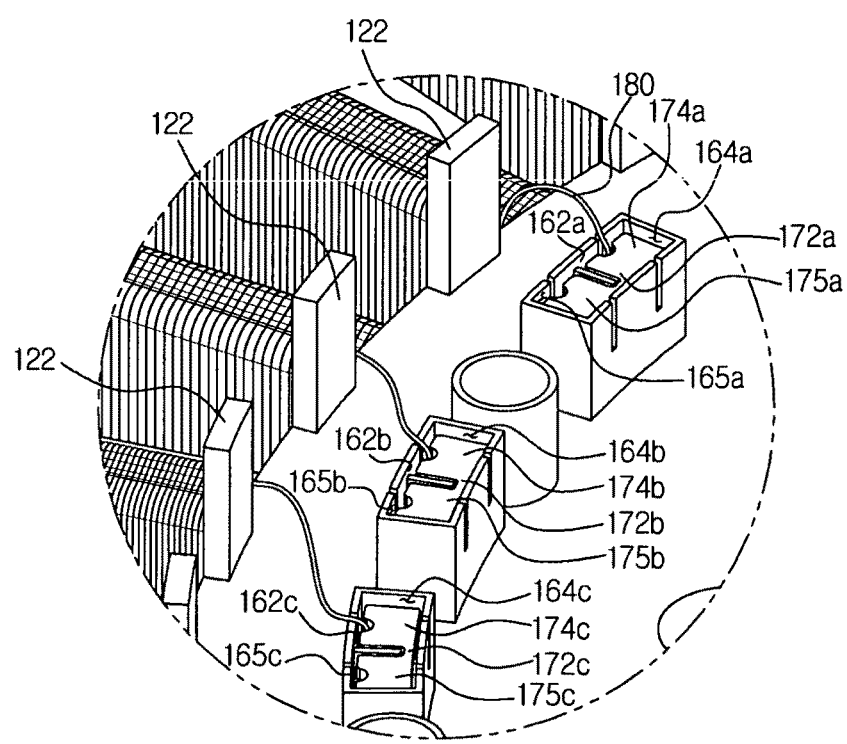
FIG. 4A is a perspective view of the portion "A" of FIG. 2.
Figure 4B:
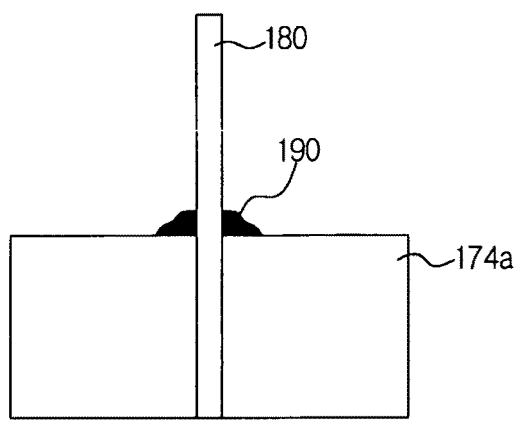
FIG. 4B is a longitudinal-sectional view illustrating the connection state of the magnet wire of FIG. 4A and a mag mate terminal.

FIG. 4A is a perspective view of the portion "A" of FIG. 2, and FIG. 4B is a longitudinal-sectional view illustrating the connection state of the magnet wire 180 of FIG. 4A and a magnetic wire mating terminal, which may include, for example, a MAG MATE ® terminal 172a.

As shown in FIG. 4A, mag mate terminal receiving units 162a, 162b, and 162c are formed at the radial inside of the coil winding ribs 122 of the upper insulator 120, and mag mate terminals 172a, 172b, 172c are respectively installed in the mag mate terminal receiving units 162a, 162b, and 162c. The mag mate terminal receiving units 162a, 162b, and 162c respectively include a first set of metal receiving parts 164a, 164b, and 164c, and a second set of metal receiving parts 165a, 165b, and 165c. The mag mate terminals 172a, 172b, 172c may be made of brass, and respectively include a first set of metal connection parts 174a, 174b, and 174c, which are installed in the first set of metal receiving parts 164a, 164b, and 164c, and a second set of metal connection parts 175a, 175b, and 175c, which are installed in the second set of metal receiving parts 165a, 165b, and 165c. As will be discussed later, an element made of material that is different from the first set of metal connection parts 174a-c is connected with the first set of metal connection parts 174a-c, while an element made of material that is the same as the second set of metal connection parts 175a-c is connected with the second set of metal connection parts 175a-c. Here, the first set of metal connection parts 174a, 174b, and 174c and the second set of metal connection parts 175a, 175b, and 175c are formed integrally. Lower portions of the first set of metal connection parts 174a, 174b, and 174c and lower portions of the second set of metal connection parts 175a, 175b, and 175c are connected such that current flows between the first set of metal connection parts 174a, 174b, and 174c and the second set of metal connection parts 175a, 175b, and 175c.

Ends of the magnet wires 180, which may be made of aluminum, are connected to the first set of metal connection parts 174a, 174b, and 174c, and the remaining portions of the magnet wires 180 are wound on the winding part units 121 and 131. The magnet wires 180 are made of a material that is different from that of the first set of metal connection parts 174a-c.

As shown in FIG. 4B, a sealing member 190 serving as an anti-corrosion member to prevent corrosion due to a potential difference is further formed at the connection portion between each of the first set of metal connection parts 174a, 174b, and 174c and the magnet wire 180. The sealing member 190 surrounds the connection portion and thus seals the connection portion. By forming the sealing member 190, it may be possible to prevent generation of electrolytes at the connection portion of the magnet wire 180 and each of the mag mate terminals 172a, 172b, and 172c. The sealing member 190 may be made of epoxy resin, synthetic resin, or bond, for example. Additionally, the sealing member 190 may be made of various materials, which may prevent the generation of the electrolyte. A power connector (not shown) is connected to the second set of metal connection parts 175a, 175b, and 175c. The power connector may be made of brass, which is the same material as that of the second set of metal connection parts 175a, 175b, and 175c. Thus, the power connector and the second set of metal connector parts 175a-c are made from the same kind of material.

Since the mag mate terminals 172a, 172b, and 172c are separated into the first set of metal connection parts 174a, 174b, and 174c and the second set of metal connection parts 175a, 175b, and 175c, and the magnet wire 180, which is made of a material differing from that of the mag mate terminals 172a, 172b, and 172c, i.e., made of aluminum, is connected to the first set of metal connection parts 174a, 174b, and 174c, the sealing members 190 are provided to prevent generation of the electrolytes on the first set of metal connection parts 174a, 174b, and 174c. Further, since the power connector, which is made of the same material as that of the mag mate terminals 172a, 172b, and 172c, i.e., made of brass, is connected to the second set of metal connection parts 175a, 175b, and 175c, there is no probability of electrolyte generation on the second set of metal connection parts 175a, 175b, and 175c, and thus the second set of metal connection parts 175a, 175b, and 175c do not require separate sealing treatment. That is, the problem generated when the magnet wire 180 is made of aluminum is solved by the improvement of the structure of the mag mate terminals 172a, 172b, and 172c (e.g., separating metal connection parts into a first set 174a-c which connects with a different type of material and a second set 175a-c which connects with the same type of material.

Figure 5A:
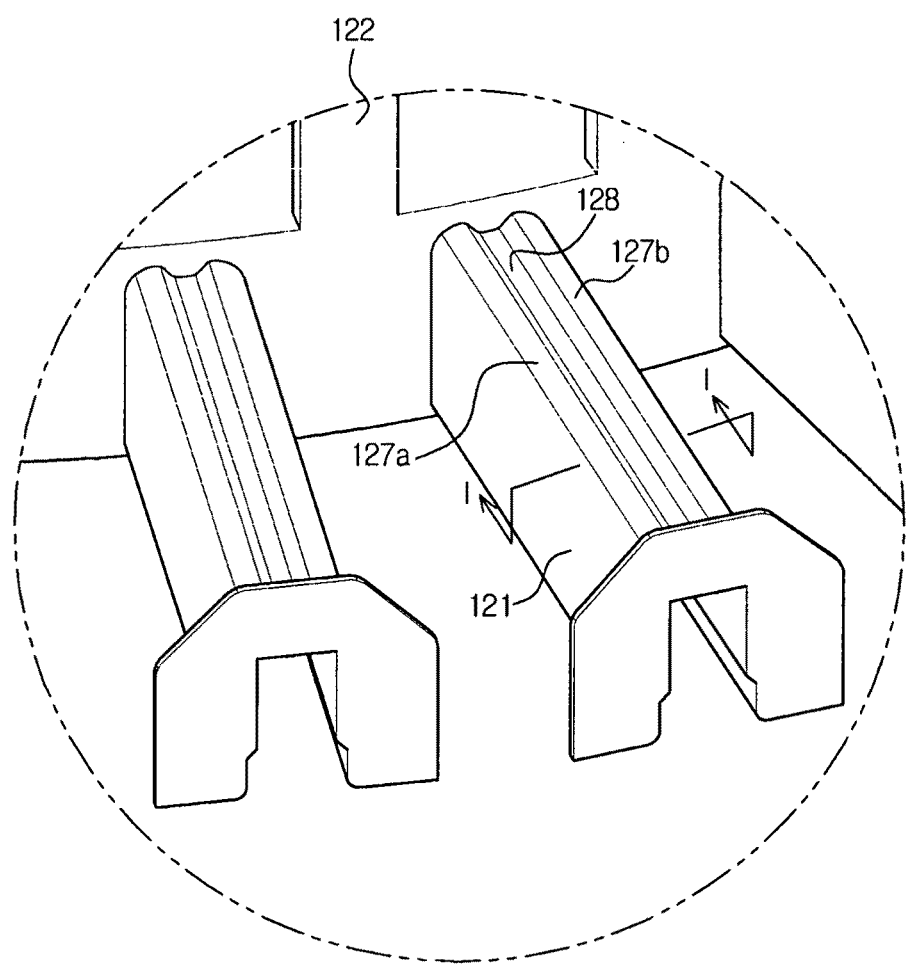
FIG. 5A is a perspective view of the portion "B" of FIG. 3.
Figure 5B:
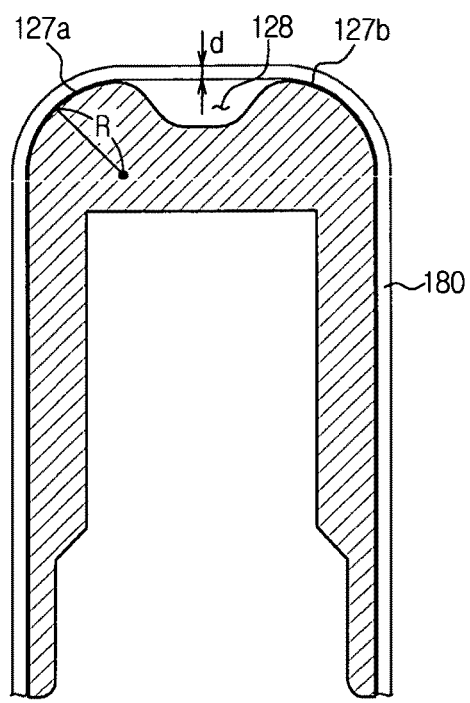
FIG. 5B is a longitudinal-sectional view taken along the line I-I of FIG. 5A.

FIG. 5A is a perspective view of a portion "B" of FIG. 3, and FIG. 5B is a longitudinal-sectional view taken along the line I-I of FIG. 5A.

As shown in FIGS. 5A and 5B, bending parts 127a and 127b are formed at both corners of the upper surface of each of the winding parts 121 of the upper insulator 120. Further, a groove 128 is formed between both bending parts 127a and 127b. Bending parts 127a and 127b and grooves 128 are also provided on the lower insulator 130.

Since the magnet wire 180 is made of aluminum, for example, instead of copper, the bending parts 127a and 127b are employed. Compared with the magnet wire made of copper, the magnet wire 180 made of aluminum has a higher ductility and stretches well when the magnet wire 180 is wound on the insulators 120 and 130, and thus the stretching portions of the magnet wire 180 become thin. Thereby, the magnet wire 180 made of aluminum has a high possibility of dent or damage to a film of the magnet wire 130 due to the contact with corners of the insulators 120 and 130, and, if severely damaged, may be cut.

However, when the bending parts 127a and 127b are formed on the winding parts 121 and 131, on which the magnet wire 180 is wound, there is no possibility of dent of the magnet wire 130 or damage to the film of the magnet wire 130 due to the gentle shape of the bending parts 127a and 127b. That is, force caused by winding is conventionally concentrated on specific portions of the magnet wire 180 contacting the insulators 120 and 130, but when the bending parts 127a and 127b are formed, contact areas between the magnet wire 180 and the insulators 120 and 130 are increased, and thus force caused by winding is uniformly applied to the increased contact areas. Thus, it may be possible to prevent damage to the specific portions of the magnet wire 180. Further, it may be possible to prevent the thinning of the specific portions of the magnetic wire 180 contacting the corners of the insulators 120 and 130.

When the winding part units 121 and 131 are formed by connecting the upper insulator 120 and the lower insulator 130 and the magnet wire 180 is wound on the winding part units 121 and 131, the radius of curvature (R) of the bending parts 127a and 127b is approximately 1.5 times to 5 times the diameter (d) of the magnet wire 180. Further, the radius of curvature (R) of the bending parts 127a and 127b may be about 2 times the diameter (d) of the magnet wire 180. These bending parts 127a and 127b start from the side surface of the winding part 121 and are smoothly extended to the groove 128.

The smaller the radius of curvature (R) is than the diameter (d) of the magnet wire 180, the higher a cost reducing effect of the magnet wire 180. However, the larger the radius of curvature (R) is than the diameter (d) of the magnet wire 180, the higher a damage preventing effect of the magnet wire 180. Therefore, the radius of curvature (R) may be about 2 times the diameter (d) of the magnet wire 180.

Further, the consumption amount of the magnet wire 180, which does not interact with the stator core 110, is reduced by forming the grooves 128 at the central portions of the winding parts 121 and 131. That is, current flowing along the magnet wire 180 wound on the winding parts 121 and 131 causes interaction with the stator core 110 only within a designated distance between the magnet wire 180 and the stator core 110, but does not cause interaction with the stator core 110 when the magnet wire 180 exceeds the designated distance with the stator core 110. That is, a portion of the wound magnet wire 180, which exceeds the designated distance with the stator core 110, becomes an unnecessary portion. Therefore, the consumption amount of the unnecessary magnet wire 180 located at the central portions of the winding parts 121 and 131 is highly reduced by forming the grooves 128 on the winding parts 121 and 131.

Hereinafter, a process of operating a motor and a washing machine having the same in accordance with an embodiment will be described.

A user opens the door 13 of the case 10 of the washing machine, puts laundry into the washing machine through the opening 19, closes the door 13, and operates the washing machine. When current is applied to the motor 300 according to a signal of a control unit (not shown), the motor 300 is operated and rotates the drum 18, and thus washing and dehydrating courses are carried out.

Here, the current applied to the motor 300 is supplied to the second set of metal connection parts 175a, 175b, and 175c of the mag mate terminals 172a, 172b, and 172c of the stator 100 through the power connector. Since the power connector and the second set of metal connection parts 175a, 175b, and 175c are made of the same kind of material, i.e., brass, for example, there is no possibility of corrosion generation due to a potential difference. Then, the current flows into the magnet wire 180 via the second set of metal connection parts 175a, 175b, and 175c and the first set of connection parts 174a, 174b, and 174c of the mag mate terminals 172a, 172b, and 172c. Here, since the first set of metal connection parts 174a, 174b, and 174c may be made of brass and the magnet wire 180 may be made of aluminum, i.e., different materials, there is a possibility of generation of corrosion due to a potential difference therebetween. However, generation of electrolytes is suppressed due to the presence of the sealing members 190. When a rotating magnetic field is formed by applying current to the stator 100, as described above, the rotor 200 is rotated along the stator 100, and thus rotates the drum 18 connected to the rotor 200 by the rotary shaft 25.

As is apparent from the above description, in the motor and the washing machine having the same in accordance with an embodiment, the connection portions between the magnet wire and the mag mate terminals, which are made from different materials, are sealed, and thus electrolytes are not generated, and cut-off of the magnetic wire by corrosion due to a potential difference may be prevented.

Further, the bending parts, the corners of which are rounded, are formed on the insulators, and thus damage to a film of the magnet wire or dent of the magnet wire may be prevented.

Further, the grooves are formed on the central portions of the winding parts of the insulators, and thus the consumption amount of the magnet wire, which is unnecessarily wasted due to the increase of the distance of the magnet wire with the stator core, is reduced.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A motor, comprising:
  a stator, on which a magnet wire is wound, including magnet wire mating terminals connected with the magnet wire, each of the magnet wire mating terminals including a first metal connection part connected to a metal of a different kind than the first metal connection part, and a second metal connection part connected to a metal of a same kind as the second connection part; and a rotor rotated by electromagnetic interaction with the stator, wherein the first metal connection part and the second metal connection part are disposed in a circumferential direction of the stator, the first metal connection part is connected to the magnet wire, and the second metal connection part is connected to a power connector configured to supply power to the stator.

2. The motor according to claim 1, wherein the first metal connection part including a sealing member to seal a connection portion between the first metal connection part and the magnet wire to prevent corrosion due to a potential difference.

3. The motor according to claim 2, wherein the sealing member is an epoxy resin.

4. The motor according to claim 2, wherein the sealing member is a synthetic resin.

5. The motor according to claim 2, wherein the sealing member is a bonding material.

6. The motor according to claim 1, wherein the stator includes a stator core and insulators surrounding an exterior of the stator core and provided with winding parts on which the magnet wire is wound, each of the winding parts including bending parts having rounded corners.

7. The motor according to claim 6, wherein each of the winding parts further includes a groove formed at a central portion of each of the winding parts.

8. The motor according to claim 6, wherein the radius of curvature of each of the bending parts is about 1.5 times to about 5 times the diameter of the magnet wire.

9. The motor according to claim 1, wherein the magnet wire is aluminum, and the magnet wire mating terminals are brass.

10. A washing machine, comprising:
a tub;
a drum rotated in the tub;
a stator mounted on the rear surface of the tub, and including magnet wire mating terminals connected with a magnet wire, each of the magnet wire mating terminals including a first metal connection part connected to a metal of a different kind than the first metal connection part, and a second metal connection part connected to a metal of a same kind as the second connection part; and
a rotor rotating the drum by electromagnetic interaction with the stator, wherein the first metal connection part and the second metal connection part are disposed in a circumferential direction of the stator, the first metal connection part is connected to the magnet wire, and the second metal connection part is connected to a power connector configured to supply power to the stator.

11. The washing machine according to claim 10, wherein the magnet wire is connected to the first metal connection part the first metal connection part including a sealing member to seal a connection portion between the first metal connection part and the magnet wire to prevent corrosion due to a potential difference.

12. The washing machine according to claim 11, wherein the sealing member is an epoxy resin.

13. The washing machine according to claim 11, wherein the sealing member is a synthetic resin.

14. The washing machine according to claim 11, wherein the sealing member is a bonding material.

15. The washing machine according to claim 10, wherein:
the stator includes a stator core and insulators surrounding an exterior of the stator core and provided with winding parts, on which the magnet wire is wound, each of the winding parts including bending parts having rounded corners.

16. The washing machine according to claim 15, wherein each of the winding parts further includes a groove formed at a central portion of each of the winding parts.

17. The washing machine according to claim 15, wherein the radius of curvature of each of the bending parts is about 1.5 times to about 5 times the diameter of the wound magnet wire.

18. The washing machine according to claim 10, wherein the magnet wire aluminum, and the magnet wire mating terminals are brass.

* * * * *